United States Patent Office

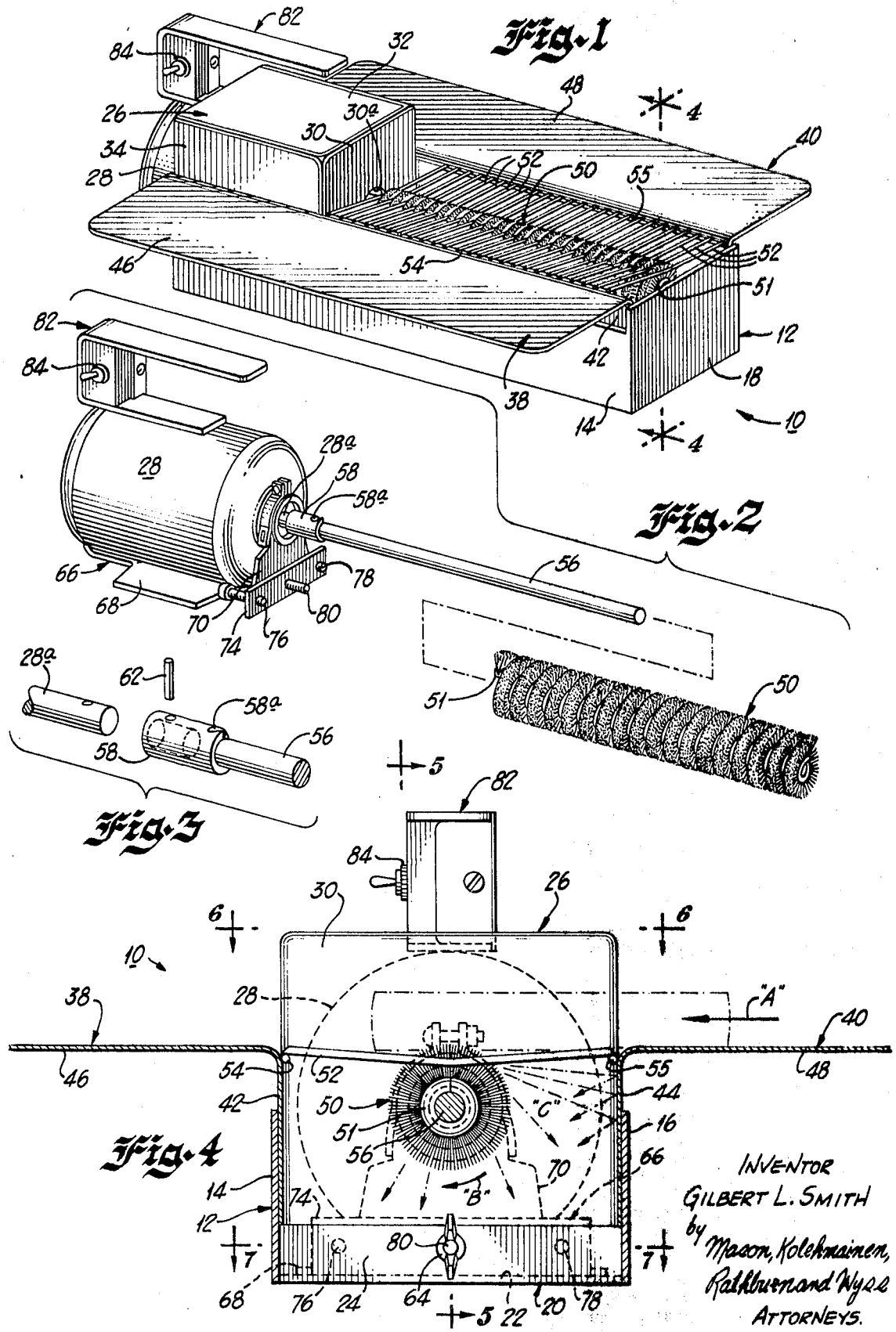

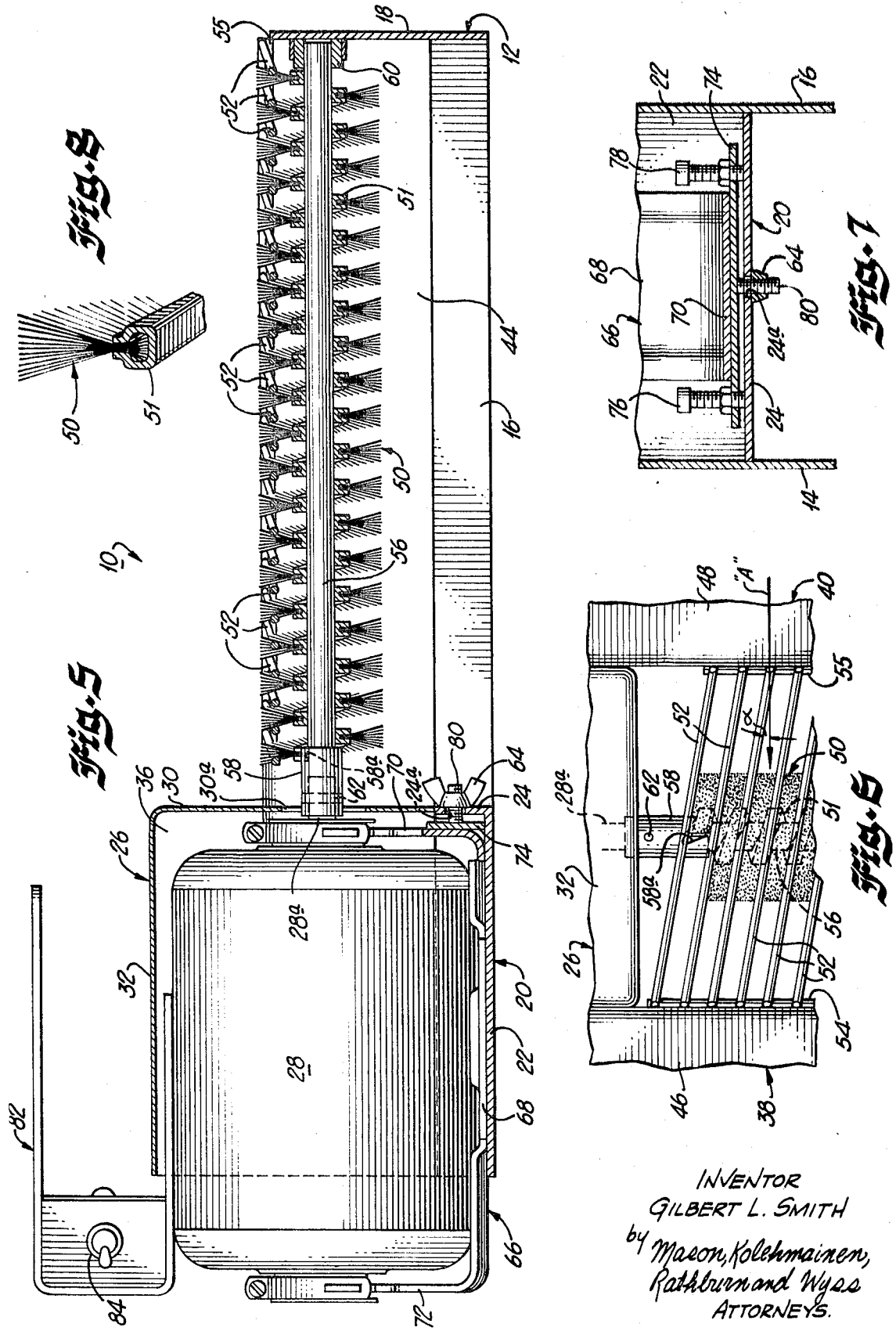

3,579,697
Patented May 25, 1971

3,579,697
MEAT CLEANING BRUSH
Gilbert L. Smith, 1305 23rd St., Peru, Ill. 61354
Filed Dec. 1, 1969, Ser. No. 881,157
Int. Cl. A46b *13/02*
U.S. Cl. 15—3.1
12 Claims

ABSTRACT OF THE DISCLOSURE

A meat cleaning appliance for removal of foreign material from the surface of pieces of meat comprising a housing having opposite sidewalls, a grid structure between said sidewalls for supporting the meat on a cleaning pass, and rotary brush means mounted for rotation in said housing on an axis spaced longitudinally between said sidewalls below said grid structure. The grid structure comprises a plurality of spaced apart V-shaped grids having the apexes spaced below the upper edges of the housing sidewalls and the radial bristles of the brush means project upwardly above the apexes of the grids for cleaning engagement with the meat surfaces.

---

The present invention relates to a new and improved meat cleaning apparatus and, more particularly, relates to a power driven rotary brush for the cleaning and removal of foreign matter, such as bone dust, fat, and marrow from the surface of pieces of meat.

After pieces of meat have been cut or sliced with an electric saw, or rotary slicing knife, the surface of the meat is often left in an unattractive condition because of the accumulation of bone dust, fat, marrow, blood, etc. The present invention has for an object the provision of a new and improved meat cleaning apparatus for cleaning and brushing the surface of such pieces of meat in a safe, fast, clean, and efficient manner.

It is another object of the present invention to provide a new and improved meat cleaning device adapted to be removably seated in an opening or slot in a processing table, work surface or between a pair of spaced work surfaces so that pieces of meat may be easily moved from one work surface across the cleaning device to the opposite work surface on a cleaning pass.

Another object of the present invention is to provide a new and improved meat cleaning device of the character described having novel means for maintaining the adjacent work surfaces free of material removed from the surface of the meat.

Another object of the present invention is to provide a new and improved meat cleaning device of the character described having a novel rotary brush construction and support and driving means therefor which permits easy removal from the housing for cleaning and sanitizing purposes and permits rapid reinstallation in the housing after cleaning is accomplished.

Another object of the present invention is to provide a new and improved meat cleaning device of the character described having a novel brush construction including a helical bristle carrier removably mounted on an axle supported in a novel manner at opposite ends thereof.

Another object of the present invention is to provide a new and improved meat cleaning device of the character described having novel grid means for supporting pieces of meat during contact with a rotating brush assembly in a manner whereby excellent cleaning of the entire meat surface is obtained upon a single pass of the meat over the rotating brush.

Another object of the present invention is to provide a new and improved meat cleaning device of the character described having a novel arrangement for removably supporting, accurately aligning and securing drive motor means for the rotary brush assembly in position in the housing of the apparatus.

Another object of the present invention is to provide a new and improved meat cleaning device of the character described having unique handle means aiding the removal or replacement of the drive motor and brush assembly in the housing of the apparatus.

Another object of the present invention is to provide a new and improved meat cleaning device of the character described having a novel combination of grid structure and brush construction whereby interaction of the two provides for constant cleaning of the brush.

Another object of the present invention is to provide a new and improved meat cleaning device of the character described having novel means for collecting and discharging the matter removed from the meat surface.

Another object of the present invention is to provide a new and improved meat cleaning device of the character described which is relatively simple in construction, rugged and reliable in operation, easy to clean and maintain in a sanitary condition, and easy to service and replace components thereof without significant loss of operational time.

Briefly, the foregoing and other objects and advantages of the present invention are accomplished by providing a new and improved meat cleaning apparatus for the removal of foreign matter from the surface of pieces of meat comprising a housing having opposite sidewalls and adapted to be supported adjacent a horizontal work surface. A grid structure is provided over the space between the sidewalls for supporting the pieces of meat as they are passed across the apparatus for cleaning contact with a rotary brush supported in the housing below the grid structure. The grid structure comprises a plurality of V-shaped, spaced apart, grids having their apexes positioned in a common line spaced below the level of the upper edges of the sidewalls and the bristles of the rotating brush project upwardly between the grids for cleaning engagement against the surface of the pieces of meat. As the bristles contact the surface of the meat, the foreign matter removed therefrom is discharged downwardly between the sidewalls of the housing and is not thrown upwardly and outwardly onto the adjacent work surfaces. The brush bristles are continuously being cleaned by centrifugal action and contact with the grids, and the brush and drive unit therefor are easily and rapidly removed from the housing when desired for cleaning purposes.

For a better understanding of the present invention reference should be had to the following detailed description taken in conjunction with the drawings, in which:

FIG. 1 is a perspective view looking downwardly from the front side of a new and improved meat cleaning apparatus constructed in accordance with the features of the present invention;

FIG. 2 is an exploded perspective view of the removable brush assembly and drive unit therefor of the meat cleaning apparatus of FIG. 1;

FIG. 3 is an enlarged, fragmentary, perspective view showing details of the coupling unit for connecting the drive unit to the support shaft and the helical bristle carrier of the brush assembly;

FIG. 4 is a transverse sectional view taken substantially along line 4—4 of FIG. 1 on a vertical plane parallel with the general direction of travel of a piece of meat across the brush assembly for cleaning the surface thereof;

FIG. 5 is a longitudinal sectional view taken substantially along line 5—5 of FIG. 4;

FIG. 6 is a fragmentary top plan view of a portion of the apparatus looking downwardly in the direction of the arrows 6 in FIG. 4;

FIG. 7 is a fragmentary sectional view taken along line 7—7 of FIG. 4 and illustrating means for axially aligning the drive unit and brush assembly and for securing these components in position for operation; and FIG. 8 is a fragmentary perspective view of a short end portion of the bristle carrier of the brush assembly constructed in accordance with the invention.

Referring now more particularly to the drawings, therein is illustrated a new and improved meat cleaning apparatus comprising the device 10 which is adapted to remove accumulations of bone dust, fat, marrow, blood, etc., from the surface of pieces of meat with rotary brushing action. The meat cleaning device 10 is adapted to be removably mounted in a receiving slot or opening provided in the horizontal work surface of a processing table or the like, or the device can be positioned between the ends of a pair of spaced apart tables or other support structures, preferably including horizontal work surfaces such as a table top.

In accordance with the invention, the meat cleaning device includes an elongated generally rectangular housing 12 having a pair of parallel, spaced apart lower sidewall portions 14 and 16 integrally joined at the outer end by a transverse end wall 18. The inner end portions of the sidewalls 14 and 16 are connected by an inner end wall forming member 20 (FIGS. 4 and 5) having an L-shaped cross section (FIG. 5) formed by a horizontally extending cradle or base 22 and a vertical flange 24 parallel and opposite of the outer end wall 18. As best shown in FIGS. 4 and 5, the upper edge of the inner end wall or flange 24 is spaced below the upper edge of the outer end wall 18, and a motor housing 26 is mounted between the sidewalls 14 and 16 above the end flange.

The motor housing 26 is designed to shield and enclose an electric drive motor 28, and the housing includes a vertical front wall 30 extending upwardly from the upper edge of the flange 24, a horizontal top wall 32, and a pair of vertical opposite sidewalls 34 and 36 attached to the inside surface of the lower sidewalls 14 and 16, respectively. The space at the bottom of the housing 12 between the sidewalls 14 and 16 and between the outer end wall 18 and the flange 24 and motor housing front wall 30 is preferably left open in order to permit downward discharge of material removed from the surface of the pieces of meat being cleaned by the device. A suitable waste receptacle is usually placed beneath the open bottom portion of the housing 12 to receive the discharge of material when the device is in operation.

In accordance with the invention, the meat cleaning device 10 is adapted to be supported in an operative position by a pair of elongated, flanged upper sidewall and work-surface-forming support members 38 and 40. The member 38 includes a vertical sidewall portion 42 which projects upwardly from and is secured to the inside surface of the lower sidewall 14 and, similarly, the member 40 includes a vertical sidewall portion 44. The vertical wall portions 42 and 44 form upper sidewalls for the housing 12 and along their upper edges are formed a pair of outwardly extending work-surface-forming flanges 46 and 48, respectively, adapted to support pieces of meat as they are passed horizontally across the device in the general direction of the arrow A (FIGS. 4 and 6) substantially normal to the sidewalls 14 and 16. The horizontal flange portions 46 and 48 support the device 10 when placed in a slot or opening provided in the work surface of a process table or other suitable structure, and the upper surface of the flanges define a horizontal plane of support for movement of the lower surface of the meat article as it is cleaned.

In order to support pieces of meat as they are moved across the device 10 (arrows A) between the sidewall portions 42 and 44 of the housing in cleaning contact with an elongated rotating brush assembly 50 driven by the electric motor 28, a grid structure comprising a plurality of V-shaped grid rods 52 is provided across the open space between the inner edges of the flange members 46 and 48. As best shown in FIG. 4, the apexes of the V-shaped grid rods 52 lie in a line approximately midway between and parallel of the opposite upper sidewall portions 42 and 44 and are at a level spaced below the level of the upper surfaces of the flange portions 46 and 48. The grid rods lie in vertical parallel planes and are aligned at an acute angle $\alpha$ with respect to the direction of movement of the meat across the device as represented by the arrow A in FIG. 6 in order to eliminate grid marks from being formed in the surface of the meat. The opposite outer ends of each V-shaped grid rod 52 is supported by longitudinal rods 54 and 55 adjacent the upper edges of the sidewall portions 42 and 44 and, as shown in FIG. 4, when the meat moves from right to left (arrow A) toward the brush assembly 50, it moves angularly downward with respect to the horizontal and reaches a minimum level at the line of apexes of the grid rods. Because of the downward slope of the grid rods 52, the area of maximum brush engagement against the surface of the meat is below the level of the flanges 46 and 48. The particles removed from the meat surface by the brushing action are discharged toward the right (assuming clockwise rotation of the brush assembly as indicated by the arrow B, FIG. 4) and either fall downwardly through the open bottom because of the effects of gravitation or, as shown by the arrows C, strike the sidewall portion 44 below the upper edge thereof and then fall downwardly. Particles removed from the meat surface are not thrown upwardly and out onto the flange surface 46 or 48 even though the outer ends of the bristles in the brush assembly at the top of the rotational orbit may be at a level slightly above the upper level of the flanges 46 and 48. Because of downwardly sloping V-shaped grid rods 52, the region or line of most intense brushing action is achieved at a level below the upper surface of the flanges 46 and 48, and this factor is believed to have eliminated the problem of upward discharge of brush removed particles.

The outer ends or tips of the bristles in the brush assembly 50 project upwardly beyond the upper level of the grid rods 52 to provide a precisely controlled precision area of brushing contact with the meat surface. The bristles radiate outwardly of the axis of rotation of the brush assembly 50 and are supported in an elongated, channel-like member 51 (FIG. 8) which is formed into a helical pattern having an inner diameter slightly larger than the outer diameter of a supporting axle 56 which is drivingly connected to the armature shaft 28a of the drive motor 28 by a coupling assembly 58. The outer end of the brush axle 56 is supported for rotation in a suitable, preferably nonlubricated, annular bearing assembly 60 affixed at the proper level to the inside surface of the outer end wall 18. The inner end of the brush axle is secured in the outer end portion of the bore of the sleeve coupling 58, and the armature shaft 28a is loosely or sloppily fitted into the inner end of the coupling bore and is connected thereto by a cross pin 62. The resultant coupling is a somewhat flexible connection between the armature shaft and brush axle so that slight misalignment is not a significant problem.

In accordance with the invention, the helical bristle carrier 51 with the radial bristles therein is removably mounted on the axle 56 and is driven to rotate therewith by engagement of the inner end of the bristle carrier in an eccentric slot or recess 58a (best shown in FIG. 6) provided in the coupling sleeve 58. Once the drive motor 28 and brush assembly 50 are removed from the housing 12, the helical bristle carrier 51 is easily slipped off of the axle and can be immersed in boiling water for sterilization and cleaning. Should the helical bristle array become worn or have an excessive number of bristles out of the carrier track, a new length of bristle carrier can be easily installed in place of the old one. The bristles of the brush assembly 50 are continuously being cleaned by centrifugal action as the brush assembly rotates, for example at a speed of 3450 r.p.m. In addition, the pitch of the helical bristle carrier is set up to be such that the bristles laterally engage the grid rods 52 as the brush assembly rotates. This lateral engagement also aids in removing particles clinging to the bristles. As shown in FIG. 5, the outer end of the bristle carrier 51 terminates just short of the bearing 60 which acts as a longitudinal stop for maintaining the inner end of the bristle carrier 51 in driving engagement with the drive slot 58a of the coupling sleeve.

In accordance with the invention, the drive motor 28 and rotary brush assembly 50 connected thereto are readily removable from the housing when desired. Moreover, removal of these components can be achieved after loosening a single wing nut 64 and then slipping the units longitudinally rearwardly until the forward end of the axle 56 is clear of the motor housing 26. The forward end wall 30 of the motor housing is provided with a circular opening 30a (FIGS. 1 and 5) to accommodate the axle 56 and bristle carrier 51. The motor 28 is carried in a U-shaped saddle support 66 having a horizontal base 68, a vertical forward end bracket 70, and a similar rear end bracket 72. The base 68 of the saddle is adapted to be cradled on the base portion 22 of the L-shaped inner end member 20. An alignment bar 74 is attached to the lower end of the forward bracket 70 of the motor saddle and right and left spacing screws 76 and 78 are threadedly engaged in opposite outer end portions of the bar 74 to set up the desired accurate alignment between the axis of the housing 12 and the rotational axis of the motor 28 and brush assembly. A threaded stud 80 (FIG. 7) is mounted at the center of the bar 74 to project outwardly through an aperture 24a in the inner end wall 24 for securing the drive motor in place in the housing. The wing nut 64 is threaded onto the stud 80 to draw the motor into the proper angular position with respect to the housing. Vertical adjustment of the motor position in the housing may be readily achieved by bending corner portions of the saddle base 68 downwardly or suitable shims can be used.

In order to provide for easy carrying of the device 10 as a whole and to provide for easy removal of the brush assembly 50 and drive motor 28 from the housing 12, a U-shaped handle bracket 82 is affixed to the motor casing as shown. The lower leg of the bracket is attached to the motor casing and the upper longer leg is spaced above the upper wall 32 of the motor housing by an amount sufficient to facilitate easy grasping. A motor control switch 84 is conveniently placed adjacent the bight portion of the U-shaped bracket for turning the motor on or off.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. Apparatus for cleaning the surface of pieces of meat comprising a housing including a pair of opposite sidewalls having upper edges lying on a common horizontal plane across which the surface of the meat to be cleaned is passed from one sidewall of the housing to the other; a plurality of spaced apart grids extending between said opposite housing sidewalls for supporting the meat during a cleaning pass, each of said grids including opposite ends secured adjacent the level of the upper edge of said sidewalls and sloping downwardly of said plane toward a minimum level between said sidewalls; rotary brush means removably mounted in said housing for rotation about an elongated axis spaced between said sidewalls below said minimum level of said grids and generally transversely thereof, said brush means including a plurality of bristles extending radially of said axis and arranged in a helical pattern, said bristles including outer end portions projecting upwardly above said grids for cleaning contact with said meat.

2. The apparatus of claim 1 wherein the outer end portions of said bristles project upwardly to a level substantially the same as said common plane.

3. The apparatus of claim 1 wherein said grids comprise a plurality of parallel, V-shaped rods arranged on vertical planes which angularly intersect said axis of rotation of said brush means.

4. The apparatus of claim 3 wherein said brush means includes a support axle mounted on a vertical plane intersecting minimum level points on said V-shaped grid rods, and a helical bristle carrier telescoped onto said axle for rotation therewith.

5. The apparatus of claim 4 wherein said housing includes an outer end wall connecting said sidewalls and bearing means on said end wall for supporting an outer end of said support axle.

6. The apparatus of claim 5 wherein said housing means includes inner end wall means connecting inner end portions of said sidewalls; motor means having a drive shaft and removably supported on said inner end wall means; flexible coupling means for connecting said drive shaft to the inner end of said brush support axle.

7. The apparatus of claim 6 including means drivingly engaging said coupling means and one end of said helical brush carrier.

8. The apparatus of claim 6 wherein said inner end wall means includes an inner end wall opposite said outer end wall and having drive opening means therein in coaxial alignment with said bearing means on said outer end wall permitting axial withdrawal of said brush means from between said housing sidewalls.

9. The apparatus of claim 8 wherein said inner end wall means includes a horizontal base portion for supporting said motor means and removable fastener means for securing said motor means to said inner end wall means.

10. The apparatus of claim 3 including support flanges extending outwardly from said upper edges of said sidewalls on said common plane for guiding said pieces of meat upon movement across said grids and rotary brush means.

11. The apparatus of claim 10 wherein said sidewalls are parallel with said axis of rotation of said rotary brush means and said grids are arranged to lie in parallel vertical planes angularly intersecting said sidewalls at an acute angle.

12. The apparatus of claim 11 wherein said helical pattern of said bristles around said axis of rotation angularly intersects said vertical planes of said grids.

References Cited

UNITED STATES PATENTS

| 2,799,877 | 7/1957 | Scott | 15—3.1 |
| 3,231,915 | 2/1966 | Bonham et al. | 15—3.1 |
| 3,237,228 | 3/1966 | Smith | 15—3.1 |

EDWARD L. ROBERTS, Primary Examiner

U.S. Cl. X.R.

15—77